United States Patent [19]

Schlags

[11] Patent Number: 4,890,343
[45] Date of Patent: Jan. 2, 1990

[54] PORTABLE DECONTAMINATION TANK

[76] Inventor: Michael L. Schlags, 377 Oak Tree Way, Buellton, Calif. 93427

[21] Appl. No.: 209,003

[22] Filed: Jun. 20, 1988

[51] Int. Cl.$^4$ .............................................. A47K 3/06
[52] U.S. Cl. ...................................... 4/585; 220/5 A
[58] Field of Search .................................. 4/585-588, 4/599; 220/5 A

[56] References Cited

U.S. PATENT DOCUMENTS

| | | | |
|---|---|---|---|
| 2,581,883 | 1/1952 | Rechler | 4/586 |
| 3,373,451 | 3/1968 | Schmidt | 4/585 |
| 3,557,392 | 1/1971 | Schmidt | 4/585 |
| 3,800,336 | 4/1974 | Hoxeng | 4/587 |
| 4,675,923 | 6/1987 | Ashley | 4/599 |
| 4,713,850 | 12/1987 | Flaherty | 4/585 |

FOREIGN PATENT DOCUMENTS

| | | | |
|---|---|---|---|
| 0600884 | 6/1960 | Canada | 4/585 |
| 0692386 | 8/1964 | Canada | 4/585 |
| 0566883 | 2/1924 | France | 4/585 |
| 0549998 | 3/1955 | Italy | 4/585 |
| 0049112 | 2/1910 | Switzerland | 4/585 |
| 0647577 | 12/1950 | United Kingdom | 4/587 |

*Primary Examiner*—Jimmy G. Foster
*Attorney, Agent, or Firm*—Mark C. Jacobs

[57] ABSTRACT

A portable decontaimination chamber to be used by hazardous material decontaminators. The unit has a tubular substructure that is readily assembled and has a vessel portion formed from a plastic film attached to the superstructure. The base of the vessel rests on the ground, and the person to be decontaminated steps into the vessel to be doused with water which collects therein for ultimate disposal.

8 Claims, 5 Drawing Sheets

PORTABLE DECONTAMINATION TANK

BACKGROUND OF THE INVENTION

As our society matures, it has become more and more concerned about the disposal of toxic materials. Witness for example the recent concerns over the disposal of nuclear waste and the newly evaluated hazardous material asbestos. Of course, there are many other hazardous and toxic substances that must be gathered from locations where they cannot be tolerated.

Today we even have special teams trained to collect and/or prevent the spread of toxic and hazardous materials.

Decontamination, the next step for those personnel involved with hazardous materials, often referred to in the industry as "hazmat" is of utmost importance. That is, the personnel involved in the collection and transportation of hazardous and toxic substances must be able to cleanse themselves without further contaminating the environment.

Many such personnel are firemen; others work for hazmat management companies and deal with the more hazardous substances such as PCB's and dioxin among others.

The EPA has ruled that while the hazmat personnel must wear special clothing the water used to clean off this special clothing must be collected for special disposition such as in sealed cans or drums.

Thus it is seen that problems can arise in trying to meet these EPA regulations, concerning the wash water, in trying to contain and collect it.

It is an object therefore of this invention to provide a portable disposable decontamination tank.

It is another object to provide a decontamination tank that can be erected at the site of the decontamination.

Yet another object is to provide a decontamination tank that can be readily disassembled for disposal immediately after usage.

Still another object is to provide a decontamination tank that is low in cost of procurement.

Other objects of the invention will in part be obvious and will in part appear hereinafter.

The invention accordingly comprises the apparatus possessing the constructions, combination of elements and arrangement of parts which are exemplified in the following detailed disclosure and the scope of the application of which will be indicated in the appended claims.

For a fuller understanding of the nature and objects of the invention reference should be made to the following detailed description taken in conjunction with the accompanying drawings.

SUMMARY OF THE INVENTION

Figure 1:
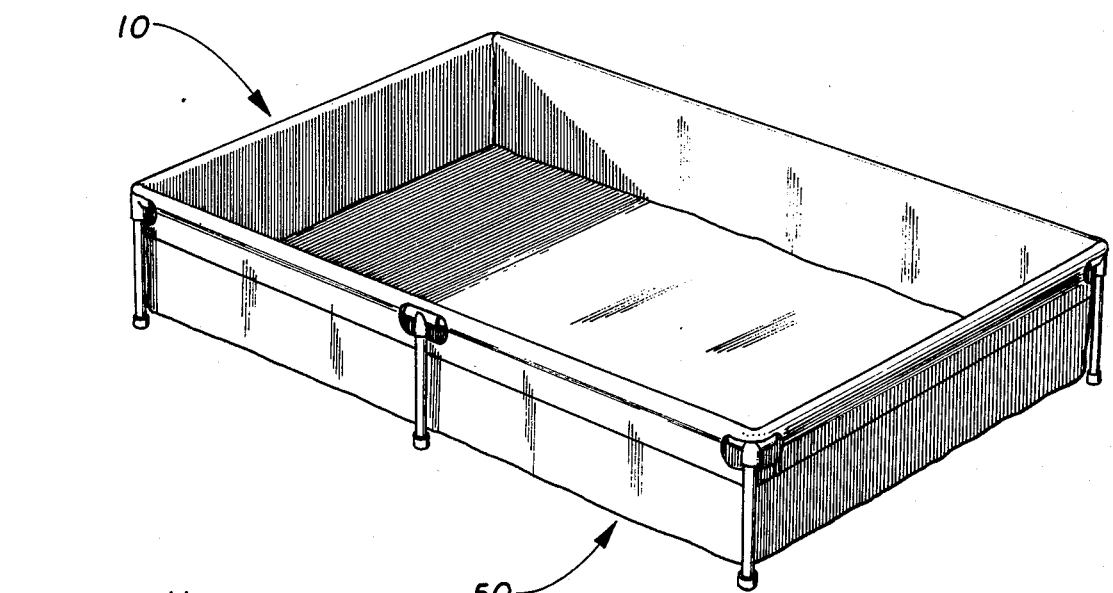
FIG. 1 is a perspective view of the decontamination tank of this invention.

A portable, quickly set up and quickly disassembled decontamination tank having a tubular plastic superstructure preferably of plastic and a one piece plastic film tank portion.

DESCRIPTION OF THE PREFERRED EMBODIMENT

The apparatus 10 of this invention comprises a superstructure 07 comprised of a plurality, usually four corner portions 09, and a plurality of one or both of intermediate portions 08 and interposed tubes 30; and a one piece flexible vinyl or similar material sheeting, shaped to form a vessel when placed upon the superstructure 07 as will be discussed, and which is designated as 50, the vessel forming portion.

Figure 2:
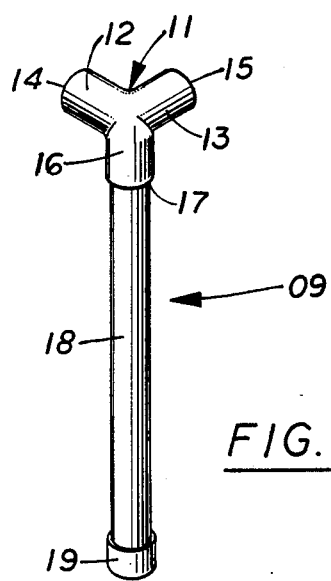
FIG. 2 is a close-up elevational view of an end portion of the superstructure of the initial apparatus.

Firstly the discussion turns to the corner position 09. As seen in FIG. 2, this portion is formed by a 90 degree -90 degree-90 degree corner connector 11, having end openings 14 and 15 in first segment 12 and second segment 13 both of which extend normally to each other and normal to the downwardly directed third segment 16 which in turn has an opening 17. Optionally as is often the case, the 3 openings aforesaid can communicate with each other internally within corner connector 11.

A corner leg 18 is threadedly or otherwise secured within opening 17 of corner connector 11 at one end thereof. Cap 19 which serves as a foot is mounted threadedly or otherwise at the other end of leg 18.

It is to be understood that both corner connector 11 and tee connector 22 to be discussed below, may be had in the marketplace with one or more of their openings being either internally (female) threaded, or smooth, and adapted for a slip (friction) fit. These two connectors and the balance of the items discussed herein pertaining to the superstructure are available in the marketplace as schedule 40 and schedule 80 P.V.C. or, A.B.S. as well as chlorinated polyvinyl chloride.

Obviously if an opening is threaded, it is understood, that a leg or interposed tube or main tube to be described below also would be oppositely threaded, here male; or if the connectors are not threaded at any opening the parts to be secured or mounted thereon would also be unthreaded and would be secured by (a) friction fit, (b) suitable adhesive readily available in the marketplace.

Figure 3:
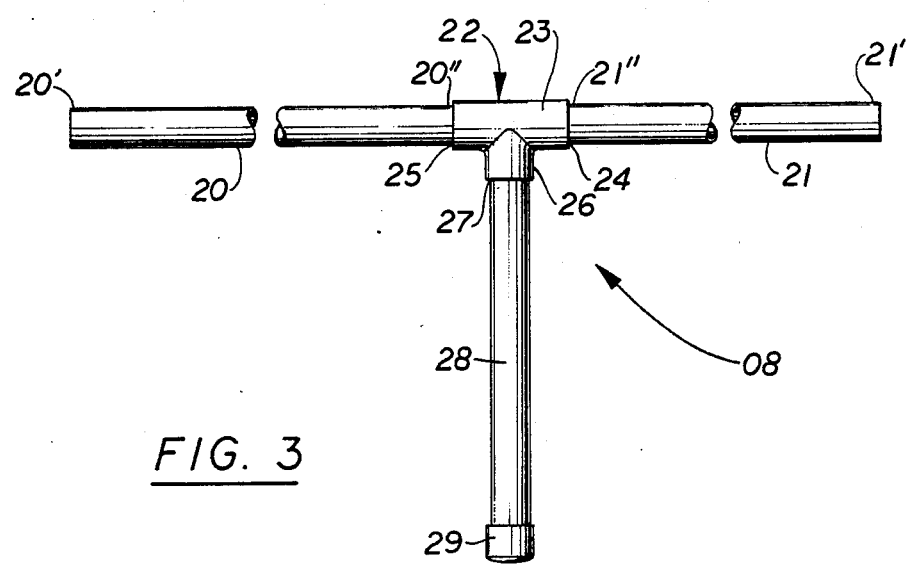
FIG. 3 is an elevational view of an intermediate portion of the superstructure of the instant device.
Figure 4:
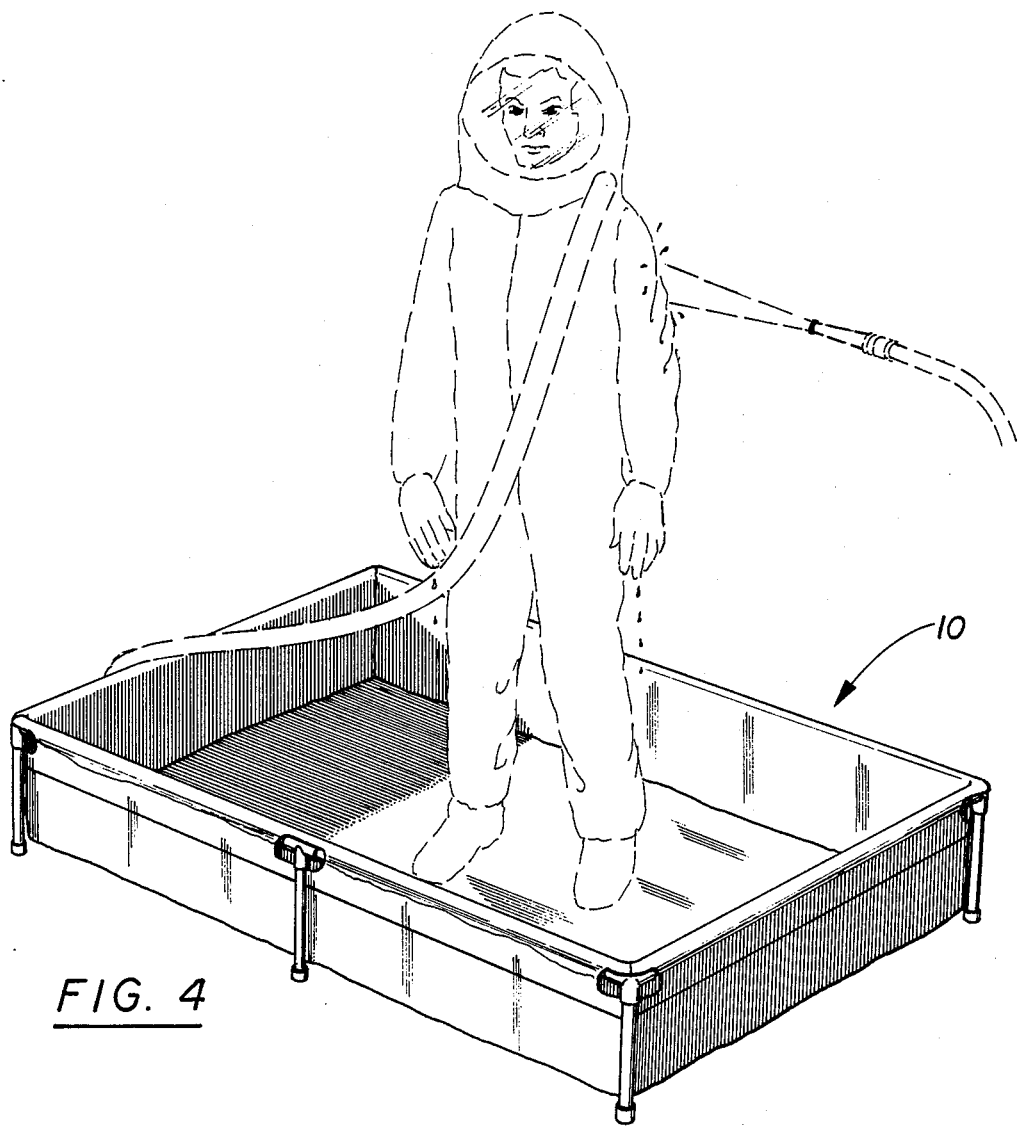
FIG. 4 is a diagrammatic perspective view illustrating the use of the instant device.

The discussion now turns to FIG. 3. Intermediate portion 08 is comprised of main tube 20 having one end 20' which is preferably threaded and a second end 20". Second end 20" is matingly engaged with horizontal opening 25 of the horizontal segment 23 of tee connector 22. Second main tube 21 has similar ends, preferably threaded, 21' and 21". This latter end 21" is threaded in the second horizontal opening 24 of tee connector 23, which itself is threaded.

The two openings 25 and 24 communicate preferably with vertical bore 27 in vertical segment 26 of this tee connector. As mentioned above if an opening is threaded in the tee connector, the tube or leg to be secured therein must bear complimentary threads, or both must be slip fit and preferably secured by adhesive.

Intermediate leg 28 is secured and mounted into opening 27 of tee connector 22, cap 29 serves as a foot and is connected to the opposite end of the leg 28 from the end thereof disposed with tee connector segment 26.

Figure 8:
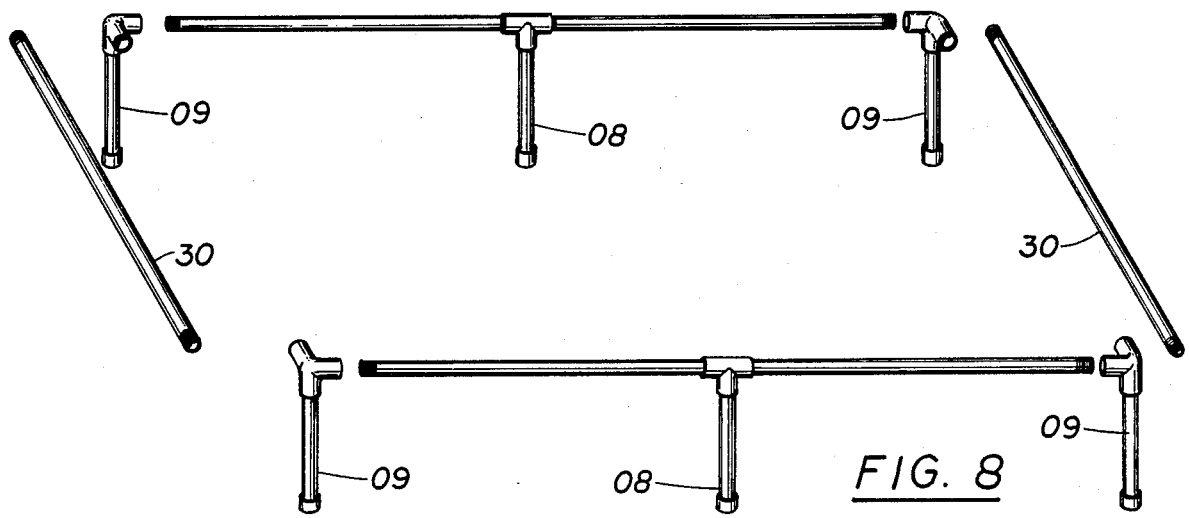
FIG. 8 is an exploded perspective view of this superstructure of this invention.

The eighth Figure is shown as an exploded view purposely, since the superstructure is not per se assembled unto itself. It is assembled within the vessel forming portion as will be described below. FIG. 8 illustrates the various components that form the structure, most of which cannot be seen in FIG. 1 as they are disposed within the vessel forming portion 50 shown in FIG. 6.

The superstructure 07 is seen having at its rear (R) and front (F) two spaced corner portions 09 and an intermediate portion 08. The connection between the two spaced corner portions 09 and the intermediate portion 08 is made by the inserting end 20' into opening 15 in corner portion 09 at the right hand end, and end 21' into opening 15 in corner portion 09 at the left hand end.

The two sides forming the superstructure can be assembled by connecting front and rear corner portions 09, with either other intermediate portions 08, or if less depth is desired from front (F) to rear (R), then simple interposed tubes 30 and having end 30' and 30", one or both of which can be threaded as discussed above are secured to a pair of aligned corner portion 09 with openings 14 and 17 facing each other.

Superstructure as shown in FIG. 8 is an exploded perspective view that illustrates the relative placement of the four corner portions 09 and the two intermediate portions front and rear, and the two side interposed tubes 30 that connect the front of the superstructure to the rear thereof.

While not shown, as has been indicated the sides (S) can also be of intermediate portions 08 if greater span or depth is desired between the front (F) and rear (R) of the superstructure 07.

Figure 5:
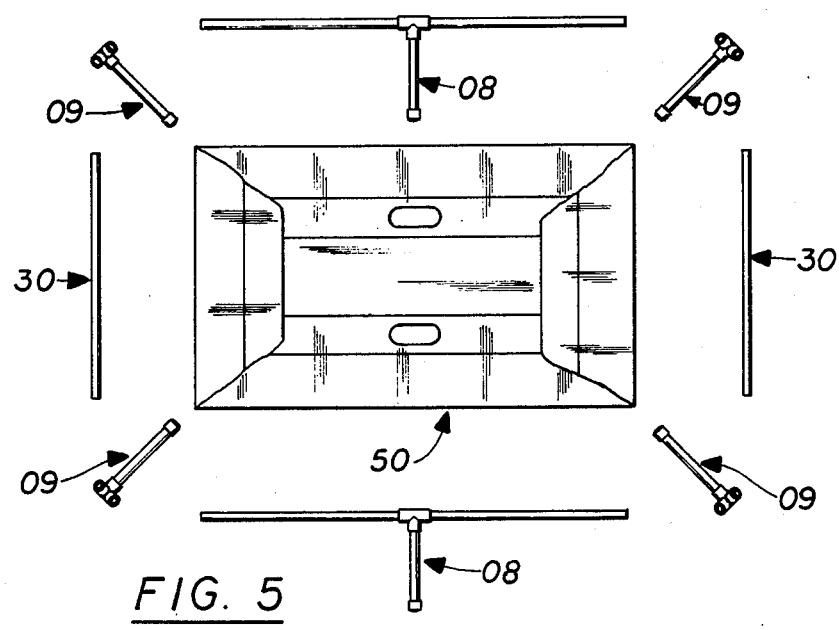
FIG. 5 is a top plan view showing the apparatus of this invention prior to assembly.

FIG. 5 shows some of the tubes and the vessel forming portion 50 laid out ready for assembly. In contrast FIG. 1 shows the exact physical configuration of the vessel forming portion 50.

Figure 6:
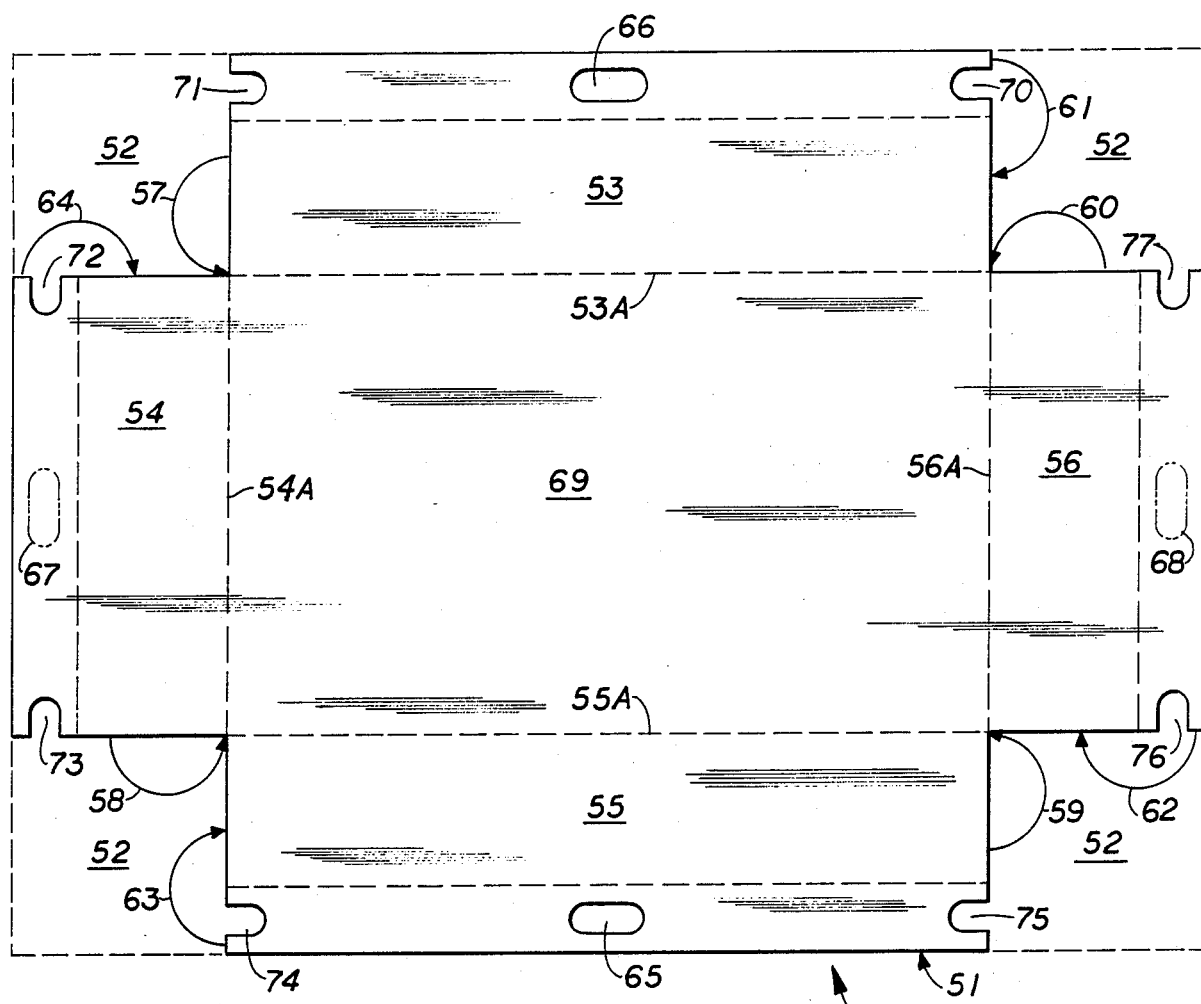
FIG. 6 is a diagrammatic view of a sheet of plastic film used for the vessel forming portion hereof prior to assembly.
Figure 7:
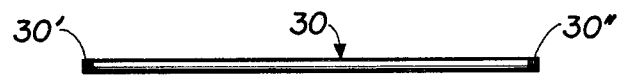
FIG. 7 is a perspective view of a portion of this invention.

The vessel forming portion 50 shown in FIG. 6 is made from a rectangular sheet 51, of 8 to 22 plastic material vinyl of other self-supporting film from which the four corners 52, each shown in dashed line have been removed, to thereby form four panels. Two of these panels 53 and 55 are opposed and are similarly sized form the front and rear of the tank and two similarly opposed panels 54 and 56 are shorter in length than panels 53 and 55 and form the sides of the tank. Panels can be adhered by a suitable adhesive, radio frequency, -dielectric seal-or by heat.

The dashed lines 53A, 54A, 55A and 56A each represent a fold line along which each respective panel 53 through 56 is folded upwardly, as shown by arrows 57 through 60, and normal to the plane of the drawing sheet.

A second fold commencing at approximately ¼ and ⅓ of the width of each now upstanding panel 53 through 56 is made as shown by dashed lines 61 through 64 such that the second fold indicated by dashed lines becomes the top edge of the now formed vessel and the outward ends of panels 53 through 56 are now oriented downward on the outside edge of the vessel and are then seated as will be described below.

By folding along the midline, each of the front and rear cutouts 65 and 66 are now near the top and outside of the newly formed front and rear walls of the vessel. Optional side cutouts and 68 are depicted in phantom line to show that their presence depends whether an intermediate portion 08 instead of interposed tubes 30 are used for joining the front and rear parts of the superstructure.

Figure 9:
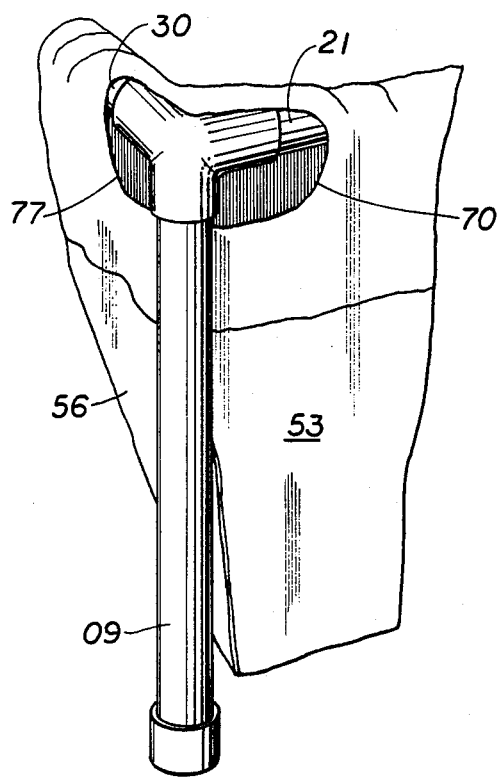
FIG. 9 is a close-up perspective view of a portion of the apparatus of FIG. 1.

As seen in FIG. 6 there are also cutouts in the edges of items 53 through 56 in addition to slots 65 and 66. Reference is made to the U-shaped notches 70 through 76 outboard of the midline outer fold area at each end of each of said four panels 53 through 56 as per FIG. 6. These notched areas remain unsealed, when the folds 61 through 64 are made, and the edges of the now folded panels are sealed together. This sealing may be by radio frequency or heating as may be desired. Reference is also made to FIG. 1 and FIG. 9 which shown how upon assembly the corner portion 09, is substantially external to the vessel 50. FIG. 9 also illustrates how the U-shaped notches at one corner appear after the two respective panels 53 and 56 have been folded over and sealed to themselves, to form sleeves.

This junction of one panel to the other can be edge to edge, but preferably there is a slight overlap of one panel to the other for strength of the "weld".

ASSEMBLY

After the notches and cutouts have been made, the proper folds made, and all panels are sealed to form a water tight vessel, a main tube 21 is then inserted through cutout 66 into the sleeve formed by panel 53 being doubled over on itself until it emerges out of notch 70. A corner portion 09 is held in place such that tube 21 can be secured therein. As noted previously this can be done by threading one into the other, or by a friction fit which is optionally glued into place if a permanent superstructure or semi-permanent superstructure is desired. For ease of disposal however, a threaded junction is preferred, especially since the chances of one member becoming unthreaded from another is quite slim.

After main tube 21 is in place, an interposed tube 30 is fed through the sleeve formed in panel 56, usually the full length of the panel and secured into opening 15 of corner portion 09. The balance of an intermediate portion 08 is positioned in place at the end of tube 21 remote from its juncture with 09, such that the opposite end of tube 21 can be inserted into opening 24 of tee 23. A second main tube 20 is fed into the other side of the sleeve 53 and secured into tee 23 at its opening 25 to thereby complete the construction of intermediate portion 08. Similarly the balance of the superstructure 07, is set into place in like fashion.

The intermediate portion 08 without tubes 20 and 21 is designated 08' as the upstanding segment thereof.

Figure 11:
FIG. 11 shows the safe disposition of the apparatus of this invention.
Figure 12:
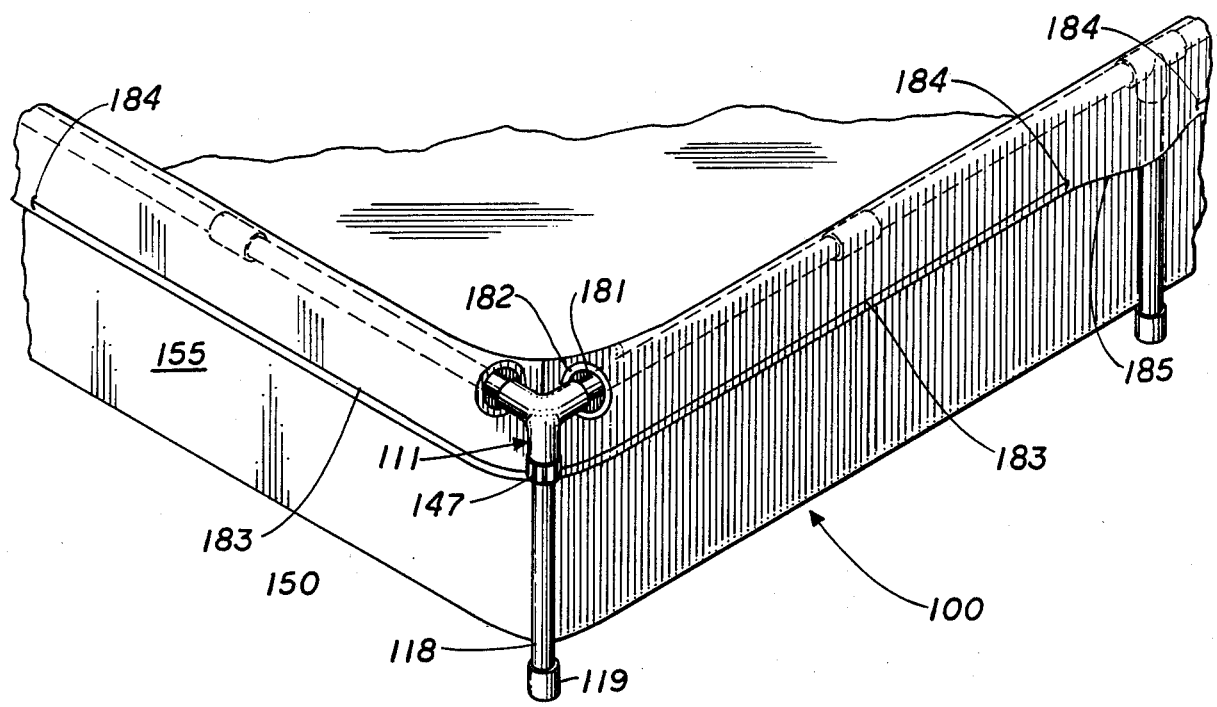
FIG. 12 is a cutaway perspective view to illustrate the mode of manufacture of a variant of the apparatus of this invention.

Turning now to FIG. 12, a variant mode of manufacture is shown. Here the variant 100, overlapped area 185, which is conventionally attached along seal line 103 up to the common cement of the overlapped but unsealed zone 184. A bore 181, which is reinforced by a grommet 182 or an equivalent means surrounds the opening 181 into the confines of the overlapped area for receipt of a main tube such as 21. Note that this tube can include a coupling such as 190 per FIG. 13 which is used to join 2 smaller tube sections. Note how in this variant, a part of the legs such as 128 is covered over. Contrast FIG. 4 to FIG. 12.

Figure 13:
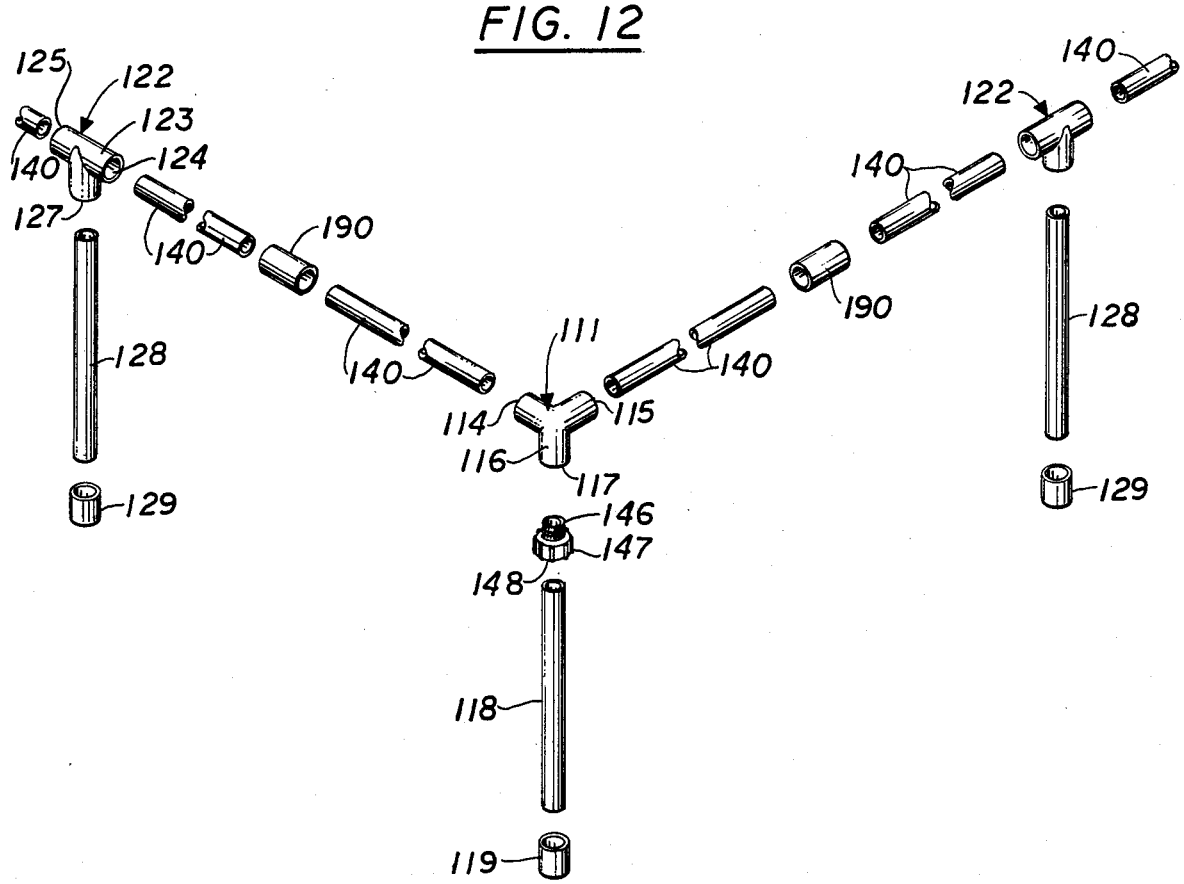
FIG. 13 is an exploded view of components utilized in the assembly of the variant of FIG. 12.

FIG. 13 illustrates the various components that can be employed in the assembly of the variant of FIG. 12. Thus a main tube 140 is connected to a tee 122; from the second side of the tee 122 emanates a second main tube 140. Coupling 190 of a slightly larger diameter encircles the second mentioned tube 140 and a third such tube 140. A "Y" connector 111 having horizontally disposed bored sections 114, and 115 is connected to this third tube, and a fourth such tube 140 in each of two bored sections. The vertical bored sections 116 receives the leg adaptor 148 having a threaded end 146 adapted to mate into a preferably threaded 117 area of vertical section 116. The lower portion 147 of the adaptor receives leg tube 118. A cap or foot 119 similar to cap or foot 129 may be employed for stability.

Also seen in FIG. 13 is another tee 122 having horizontal sections 123, 125 which may be optionally threaded 124, if threaded then a tube 140 to engage there with must be threaded, but such is not shown. Here vertical section 123 receives leg tube 128 in the manner previously discussed.

It is seen that by using couplings, and leg adapters larger units can be made with increased strength for greater stability.

Having described the construction and the assembly of the device of this invention the operation thereof is readily understood.

After a hazmat person such as a fireman has completed the decontamination, he or she steps into the vessel, the walls of which after formation are usually about 12 to 18" high. He (impersonal) is then sprayed with a hose or other source of water all over his special clothes to remove any hazmat thereupon. The watered down material collects in the vessel. See FIG. 4. This contaminated material is then collected by conventional means for disposition. The apparatus can then be disassembled, if the need for same is complete, and it can then be quickly and easily discarded. The superstructure pieces can be placed into the bottom wall 69 of the vessel and the vessel rolled up over the pieces. The entire apparatus can be tied as with a bungee cord or two and discarded in accordance with recommended procedures.

Figure 10:
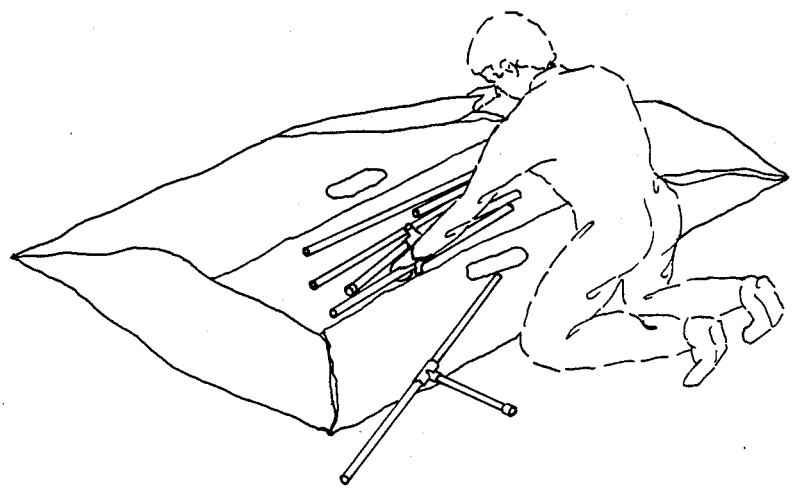
FIG. 10 is a perspective view showing the apparatus of this invention being disassembled.

Reference is made to FIG. 10, which is a perspective view showing the unit being disassembled. Here the frame members, some of which are seen, are folded into the interior of the vessel forming portion and discarded into a sealable 55 gallon drum per FIG. 11. Of course this presupposes that the wash water and hazardous material have been vacuumed out of the chamber prior to disassembly. FIG. 10 and 11 together show an acceptable mode of disposition of a contaminated decontamination tank of this invention.

It is seen that I have provided a portable apparatus that is low in cost, can be quickly and easily assembled and disassembled for use by hazardous material decontamination agents. The apparatus being low in cost can be discarded after one usage, thereby negating the necessity of cleaning it.

While the apparatus of this invention is intended primarily for one time usage, it is readily seen that the device can be readily modified at increased cost to safely permit multiple utilizations thereof. To do so would require that a heavier gauge plastic sheet material to be employed. Schedule 40 PVC tubing could be used for either one time or multiple use tubing for the superstructure.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A knockdown decontamination apparatus for use in cleansing hazmat operators special clothing, which apparatus comprises:
   (a) a superstructure and
   (b) a vessel forming foldable plastic structure made of self supporting film adapted to form a vessel open at the top, upon engagement with said superstructure, and sized to receive at least one human being therein in a standing position,
   said superstructure comprising:
   a plurality of corner portions, each having a 90 -degree 90 -degree 90 degree connector secured to a corner leg,
   and tubular means severably connecting each corner portion to another corner portion,
   said vessel forming structure comprising a one piece plastic film vessel forming structure including a bottom wall and panels attached thereto adapted to form upstanding walls to define in conjunction with said bottom wall, a vessel adapted to receive a human and water; upon the engagement of said superstructure with said vessel forming structure, each wall having a sleeve therein,
   said corner portions disposed external to said vessel forming structure upon engagement of said superstructure with said vessel forming structure, wherein the vessel forming portion has four upstanding walls upon assembly of the apparatus, each of which has a sleeve formed therein, and a notch in the wall at each end thereof thereby providing access to said sleeves, and wherein at least a pair of the upstanding walls of said vessel forming portion include a cutout in the sleeve for an intermediate portion of said superstructure.

2. The apparatus of claim 1 wherein the tubular means comprises a pair of intermediate portions each having a tee connector to which is secured a downwardly depending intermediate leg and a pair of main tubes emanating from said tee connector; and a pair of interposed tubes, said interposed tubes connecting the corner portions in a direction 90 degrees from the direction in which a pair of corners are connected by intermediate portions.

3. The apparatus of claim 1 wherein the vessel forming structure has four panels each of which forms an upstanding wall of said vessel.

4. The apparatus of claim 1 wherein the vessel forming structure is made of vinyl film.

5. A knockdown decontamination apparatus for use in cleansing hazmat operators special clothing, which apparatus comprises:

(a) a superstructure and (b) a vessel forming foldable plastic structure made of self supporting film adapted to form a vessel open at the top, upon engagement with said superstructure, and sized to receive at least one human being therein in a standing position, said superstructure comprising:

a plurality of corner portions, each having a 90 degree -90 degree-90 degree connector secured to a corner leg, and tubular means severably connecting each corner portion to another corner portion, said vessel forming structure comprising a one piece plastic film vessel forming structure including a bottom wall and panels attached thereto adapted to form upstanding walls to define in conjunction with said bottom wall, a vessel adapted to receive a human and water; upon the engagement of said superstructure with said vessel forming structure, each wall having a sleeve therein, said corner portions disposed external to said vessel forming structure upon engagement of said superstructure with said vessel forming structure, wherein the vessel forming structure includes a plurality of panels having overlapped areas with bores at least at opposite ends thereof for receiving portions of the superstructure therein, and further wherein the said overlapped areas are heat sealed to the side walls of the vessel forming structure.

6. The knockdown decontamination apparatus of claim 5 wherein the bores in the plurality of panels are reinforced.

7. The apparatus of claim 5 wherein the vessel forming structure has four panels each of which forms an upstanding wall of said vessel.

8. The apparatus of claim 5 wherein the vessel forming structure is made of vinyl film.

* * * * *